(12) United States Patent
Matsumoto et al.

(10) Patent No.: US 10,014,143 B2
(45) Date of Patent: Jul. 3, 2018

(54) FUSE UNIT (71) Applicant: YAZAKI CORPORATION, Minato-ku, Tokyo (JP)

(72) Inventors: Yusuke Matsumoto, Shizuoka (JP); Toshiko Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/950,408

(22) Filed: Nov. 24, 2015

(65) Prior Publication Data
US 2016/0079027 A1    Mar. 17, 2016

Related U.S. Application Data (63) Continuation of application No. PCT/JP2014/064128, filed on May 28, 2014.

(30) Foreign Application Priority Data

May 29, 2013 (JP) .................................. 2013-112926

(51) Int. Cl.
*H01H 85/143* (2006.01)
*H01H 85/05* (2006.01)
(Continued)

(52) U.S. Cl.
CPC ...... *H01H 85/143* (2013.01); *H01H 85/0241* (2013.01); *H01H 85/05* (2013.01);
(Continued)

(58) Field of Classification Search
CPC .. H01H 85/0241; H01H 85/05; H01H 85/143; H01H 85/042; H01H 2085/025; H01M 2/34
(Continued)

(56) References Cited

U.S. PATENT DOCUMENTS 5,645,448 A * 7/1997 Hill ...................... H01H 85/205
439/522
6,512,443 B1 * 1/2003 Matsumura .......... H01H 85/044
337/161
(Continued)

FOREIGN PATENT DOCUMENTS

| CN | 102939637 A | 2/2013 |
| JP | 2002-289171 A | 10/2002 |

(Continued)

OTHER PUBLICATIONS

Chinese Official Action dated Sep. 29, 2016 in the counterpart Chinese patent application.

(Continued)

*Primary Examiner* — Anatoly Vortman
(74) *Attorney, Agent, or Firm* — Metrolexis Law Group, PLLC (57) ABSTRACT

A fuse unit includes: a fuse element with an insertion hole into which a stud bolt inserted, the stud bolt protrudingly provided on a battery terminal fixed to a battery post protrudingly provided on an upper surface of a battery; and a resin body integrally formed with the fuse element by insert molding, and having an abutment portion abutting on a side surface of the battery. For a plurality of batteries each having the battery post at a different arrangement position, the insertion hole of the fuse element is formed in a shape allowing insertion of the stud bolt thereinto in a state where the side surface of the battery and the abutment portion of the resin body abut on each other.

13 Claims, 10 Drawing Sheets

(51) Int. Cl.
*H01H 85/02* (2006.01)
*H01M 2/34* (2006.01)
*H01H 85/042* (2006.01)

(52) U.S. Cl.
CPC .......... *H01M 2/348* (2013.01); *H01H 85/042* (2013.01); *H01H 2085/025* (2013.01); *H01M 2200/103* (2013.01)

(58) Field of Classification Search
USPC .......................................................... 337/189
See application file for complete search history.

(56) References Cited

U.S. PATENT DOCUMENTS

| | | | | |
|---|---|---|---|---|
| 6,576,838 | B2 * | 6/2003 | Matsumura | H01H 85/044 174/135 |
| 6,806,421 | B2 * | 10/2004 | Matsumura | H01H 85/044 174/50 |
| 7,176,780 | B2 * | 2/2007 | Iwata | H01H 85/044 337/161 |
| 7,663,465 | B2 * | 2/2010 | Matsumoto | H01H 85/044 337/187 |
| 7,663,466 | B1 * | 2/2010 | Jetton | H01H 85/044 337/186 |
| 8,638,188 | B2 * | 1/2014 | Iwata | G01R 1/0408 337/186 |
| 8,821,190 | B2 * | 9/2014 | Matsumura | H01H 85/044 337/186 |
| 9,287,076 | B2 * | 3/2016 | Kudo | H01H 85/044 |
| 9,490,095 | B2 * | 11/2016 | Matsumoto | H01H 85/0078 |
| 2002/0134572 | A1 | 9/2002 | Matsumura | |
| 2006/0091855 | A1 * | 5/2006 | Seo | H01M 2/0242 320/116 |
| 2009/0108982 | A1 * | 4/2009 | Ohashi | H01H 85/044 337/191 |
| 2010/0019572 | A1 * | 1/2010 | Kudo | H01H 85/044 307/10.7 |
| 2012/0302098 | A1 * | 11/2012 | Matsumoto | H01H 85/12 439/620.26 |
| 2013/0102205 | A1 | 4/2013 | Onoda | |
| 2014/0017529 | A1 * | 1/2014 | Matsumoto | B60R 16/0238 429/61 |
| 2015/0114679 | A1 * | 4/2015 | Matsumoto | B60R 16/02 174/66 |

FOREIGN PATENT DOCUMENTS

| | | |
|---|---|---|
| JP | 2010-033774 A | 2/2010 |
| JP | 2010-170822 A | 8/2010 |

OTHER PUBLICATIONS

Japanese Official Action dated Mar. 14, 2017 in the counterpart Japanese patent application.
Chinese Official Action dated Aug. 2, 2017 in the counterpart Chinese patent application.
Chinese Official Action dated Mar. 29, 2017 in the counterpart Chinese patent application.
Office action dated Nov. 1, 2017 in a counterpart Chinese patent application.
Chinese office action dated Feb. 13, 2018 in a counterpart Chinese Patent application.

* cited by examiner

FUSE UNIT

CROSS REFERENCE TO RELATED APPLICATIONS

This application is a continuation application of International Application No. PCT/JP2014/064128, filed on May 28, 2014, which claims priority to Japanese Patent Application No. 2013-112926, filed on May 29, 2013, the entire contents of which are incorporated by reference herein.

BACKGROUND

1. Technical Field

The present invention relates to a fuse unit mounted to a battery terminal fixed to a battery.

2. Description of the Related Art

There has been conventionally known a fuse unit that includes a fuse element with an insertion hole into which a stud bolt is inserted, and a resin body integrally formed with the fuse element by insert molding, wherein the stud bolt is protrudingly provided on a battery terminal fixed to a battery post protrudingly provided on an upper surface of a battery (refer to Japanese Patent Laid-Open Publication No. 2002-289171 (Patent Literature 1)).

In the fuse unit described above, the resin body is formed in an L-like shape toward a side surface side of the battery.

The fuse unit having a resin body as described above includes an abutment portion abutting on a side surface of the battery on a portion of the resin body facing the side surface of the battery. The abutment portion restricts the fuse unit so that the unit rotates with respect to the battery.

SUMMARY OF THE INVENTION

Incidentally, there are provided various types of batteries each having a battery post, which is protrudingly provided on an upper surface of a corresponding battery, at a different position. Therefore, a position of the stud bolt of the battery terminal on the upper surface of the battery may vary.

However, in the fuse unit as described above in Patent Literature 1, an insertion hole of the fuse element has a perfect circular shape, and thus there is a case where the resin body cannot be assembled to the battery or the abutment portion of the resin body does not abut on the side surface of the battery, due to the different types of the batteries, even when the stud bolt of the battery terminal was inserted into the insertion hole of the fuse element.

Therefore, an object of the present invention is to provide the fuse unit that can be assembled to the various types of batteries.

an aspect of the present invention is a fuse unit including: a fuse element including an insertion hole into which a stud bolt is inserted, the stud bolt protrudingly provided on a battery terminal fixed to a battery post protrudingly provided on an upper surface of a battery; and a resin body integrally formed with the fuse element by insert molding, and having an abutment portion abutting on a side surface of the battery, wherein, for a plurality of batteries each having the battery post at a different arrangement position, the insertion hole of the fuse element is formed in a shape allowing insertion of the stud bolt thereinto in a state where the side surface of the battery and the abutment portion of the resin body abut on each other.

The insertion hole of the fuse element may be formed in an oblong hole shape in an abutting direction between the side surface of the battery and the abutment portion of the resin body.

A tapered surface that slides with respect to an upper surface end portion of the battery may be formed at an end portion of the abutment portion of the resin body, when the resin body is assembled to the battery.

According to the present invention, there can be exerted an effect of being able to provide the fuse unit that can be assembled to various types of batteries.

DESCRIPTION OF THE EMBODIMENTS

A fuse unit according to an embodiment of the present invention will be described using FIGS. 1 to 10B.

A fuse unit 1 according to the present embodiment includes: a fuse element 13 with an insertion hole 11 into which a stud bolt 9 is inserted, the stud bolt 9 protrudingly provided on a battery terminal 7 fixed to a battery post 5 protrudingly provided on an upper surface of a battery 3; and a resin body 17 integrally formed with the fuse element 13 by insert molding, and having an abutment portion 15 abutting on a side surface of the battery 3.

For a plurality of batteries 3 each having the battery post 5 at a different arrangement position, the insertion hole 11 of the fuse element 13 is formed in a shape allowing insertion of the stud bolt 9 thereinto in a state where the side surface of each of the batteries 3 and the abutment portion 15 of the resin body 17 abut on each other.

Additionally, the insertion hole 11 of the fuse element 13 is formed in an oblong hole shape extending in a direction of abutment between a side surface of the battery 3 and the abutment portion 15 of the resin body 17.

Furthermore, a tapered surface 19 that slides with respect to an upper surface end portion of the battery 3 is formed at an end portion of the abutment portion 15 of the resin body 17, when the resin body 17 is assembled to the battery 3.

Here, the fuse unit 1 is arranged between the battery 3 mounted to a vehicle and various types of devices or the like mounted thereto, and supplies a power source from the battery 3 to the various types of devices or the like.

As illustrated in FIGS. 1 to 10, the battery 3 is formed in a cuboid shape and is protrudingly provided with the battery post 5 on its upper surface. An arrangement position of the battery post 5 on the upper surface varies depending on the type of the battery 3. The battery terminal 7 is fixed to the battery post 5.

The battery terminal 7 is made of conductive material. The battery terminal 7 is provided with a connection portion 21 including a hole into which the battery post 5 is inserted on one end side to thereby be electrically connected, and is protrudingly provided with the stud bolt 9 in an upward direction from the upper surface of the battery 3 on the other end side.

The battery terminal 7 is fixed to the battery 3 by screwing the bolt 23 in a state where the battery post 5 is inserted into the connection portion 21. The stud bolt 9 of the battery terminal 7 fixed to the battery 3 is inserted into the insertion hole 11 of the fuse element 13 of the fuse unit 1.

The fuse unit 1 includes the fuse element 13 and the resin body 17. The fuse element 13 is made of the conductive material in a thin-plate shape, and has a plurality of fusible body fixing portions 25, a plurality of tab terminals 27, a device connection hole 29, an insertion hole 11, and the like formed therein by punching processing or the like.

The plurality of fusible body fixing portions 25 couples between a power-source connection portion 31 including the insertion hole 11 and a plurality of device connection portions 33 provided with the plurality of tab terminals 27 and the device connection hole 29, and a fusible body (not illustrated) melted and cut by overcurrent is fixed.

The plurality of tab terminals 27 is each provided at the plurality of device connection portions 33, and arranged parallel to the side surface of the battery 3 by bending a bending portion 35 provided at the plurality of device connection portions 33.

The plurality of tab terminals 27 is arranged in a connector portion 37 of the resin body 17 by insert molding for forming the resin body 17 and also for integrating the fuse element 13 with the resin body 17. The plurality of tab terminals 27 is electrically connected to devices and the like by fitting of a connector (not illustrated) connected to a device, such as an electric component.

A device connection hole 29 is provided in the device connection portion 33 including two tab terminals 27 and is arranged on the upper surface of the battery 3. The device stud bolt 39 is inserted into the device connection hole 29 to thereby be electrically connected.

The device stud bolt 39 inserted into the device connection hole 29 is integrated with the resin body 17 together with the fuse element 13, by the insert molding. The device stud bolt 39 is electrically connected to devices and the like by fixing a terminal (not illustrated) connected to a device such as an alternator.

The insertion hole 11 is provided in the power-source connection portion 31 and is arranged on the upper surface of the battery 3. The stud bolt 9 of the battery terminal 7 is inserted into the insertion hole 11 to thereby be electrically connected to the battery terminal 7. Note that the insertion hole 11 and the stud bolt 9 are fixed with each other by fastening the nut 41 onto the stud bolt 9.

The fuse element 13 is cut at a predetermined position of coupling portions for coupling the power-source connection portion 31 with a plurality of device connection portions 33. Subsequently, the fuse element 13 is formed into an L-like shape as a whole by bending of the bending portion 35, and is then integrated with the resin body 17 by the insert molding.

The resin body 17 is made of insulating material such as synthetic resin, and is formed by the insert molding to be integrated with the fuse element 13. Predetermined positions such as the insertion hole 11 and the device connection hole 29 of the fuse element 13 are exposed outside (on the outer side of) the resin body 17.

The resin body 17 is molded in an L-like shape such that the insertion hole 11 and the device connection hole 29 of the fuse element 13 are positioned on the upper surface of the battery 3 and the connector portion 37 where the plurality of tab terminals 27 of the fuse element 13 is arranged is positioned on the side surface of the battery 3.

Note that, at a portion where the fusible body fixing portion 25 of the fuse element 13 of the resin body 17 is positioned, a fusible body cover 43 is mounted and thus state checking, replacement of the fusible body, or the like can be easily carried out.

A facing surface that faces the side surface of the battery 3 of the resin body 17 is provided with the abutment portion 15 abutting on the side surface of the battery 3. The abutment portion 15 restricts rotation of the fuse unit 1 about the stud bolt 9 in a state where the fuse unit 1 is assembled to the battery 3 by abutting on the side surface of the battery 3.

On the other hand, a tapered surface 19 is formed at a lower end portion of the abutment portion 15. The tapered surface 19 is inclined toward a lower side. When the fuse unit 1 is assembled from the upper surface side of the battery 3, the tapered surface 19 slides with respect to the upper surface end portion of the battery 3 and guides the positioning of the abutment portion 15 on the side surface of the battery 3.

In the fuse unit 1, for the plurality of batteries 3 each having the battery post 5 at different position, the insertion hole 11 of the fuse element 13 is formed in a shape allowing the insertion of the stud bolt 9 thereinto in a state where the side surface of the battery 3 and the abutment portion 15 of the resin body 17 abut on each other.

Specifically, the insertion hole 11 is formed in an ellipse shape extending in the abutting direction between the side surface of the battery 3, and the abutment portion 15 of the resin body 17. In the battery 3 having the shortest distance from the battery post 5 to the side surface of the battery 3 and the battery 3 having the longest distance from the battery post 5 to the side surface of the battery 3, the ellipse is set to have a length allowing insertion of the stud bolt 9 of the battery terminal 7, in a state where the side surface of the 3 and the abutment portion 15 of the resin body 17 abut on each other.

The fuse unit 1 can be assembled to the various types of batteries 3 having different distances from the battery post 5 to the side surface of the battery 3, by setting the oblong hole shape of the insertion hole 11 as described above.

Figure 1:
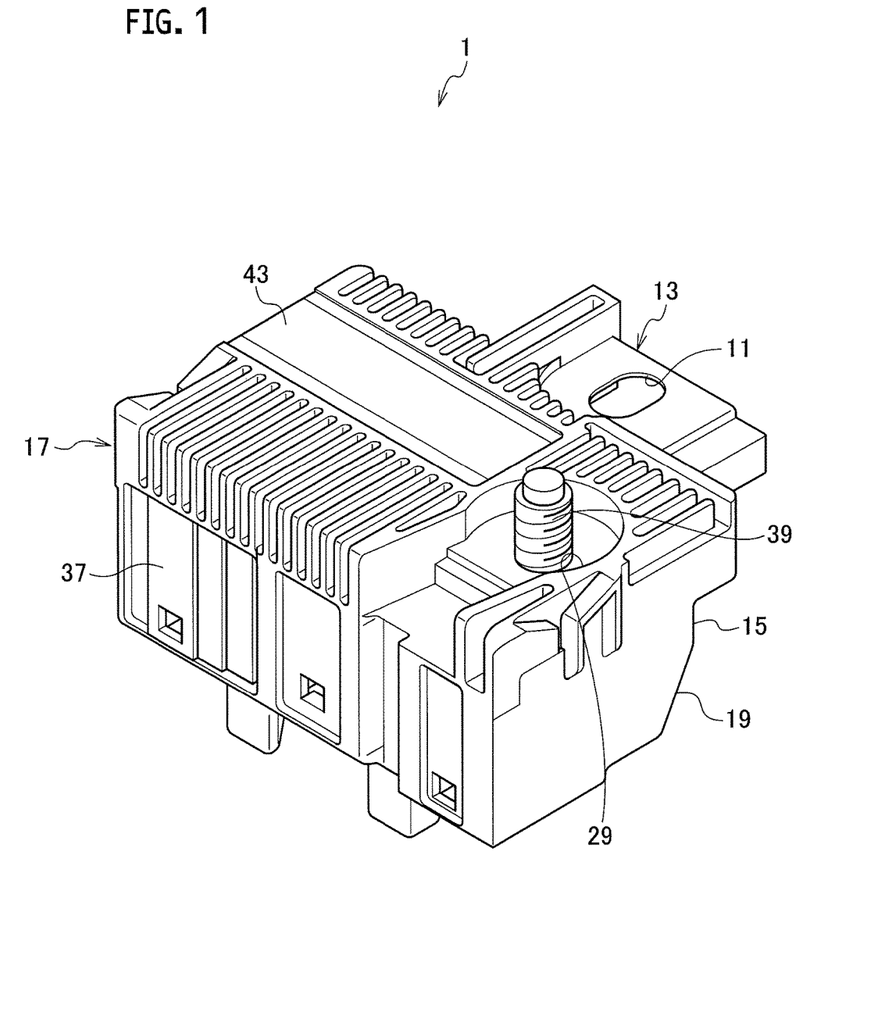
FIG. 1 is a perspective view of a fuse unit according to an embodiment of the present invention.
Figure 2A:
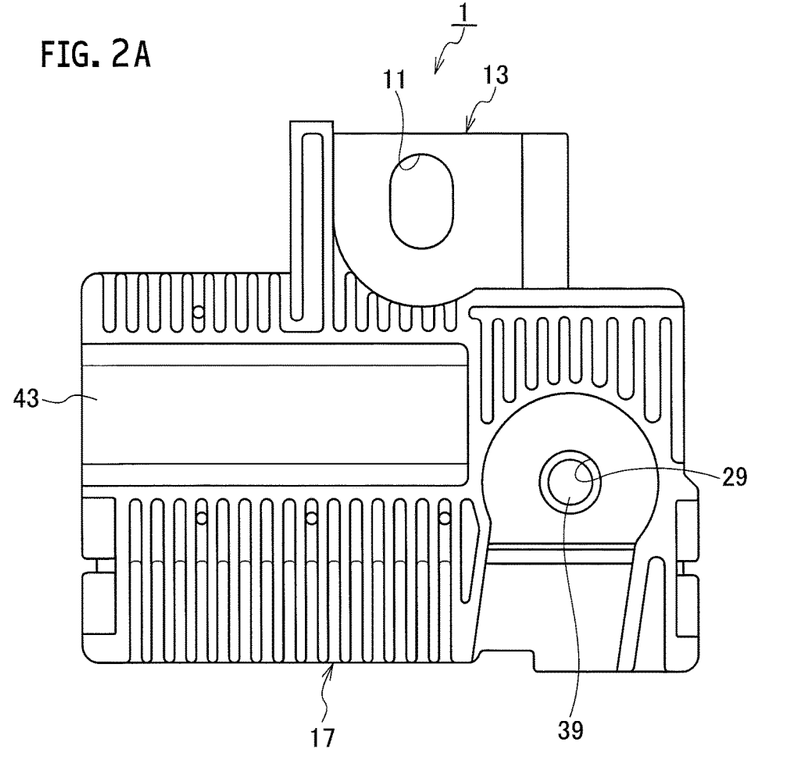
FIG. 2A is an upper surface view of the fuse unit according to the embodiment of the present invention.
Figure 2B:
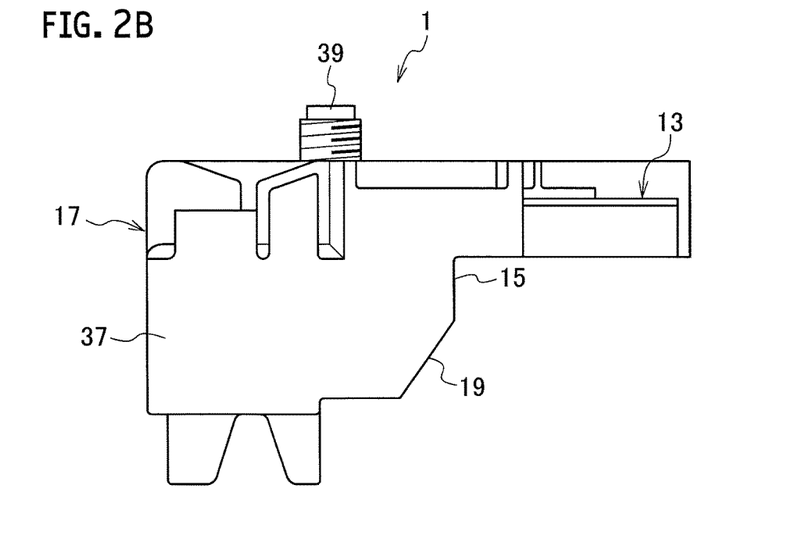
FIG. 2B is a side surface view of the fuse unit according to the embodiment of the present invention.
Figure 3A:
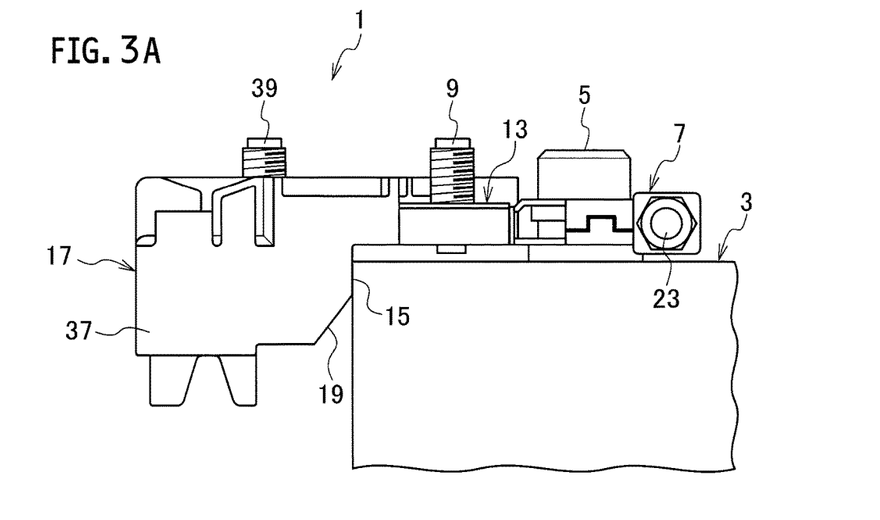
FIG. 3A is a side surface view when the fuse unit according to the embodiment of the present invention has been assembled to a battery of one example.
Figure 3B:
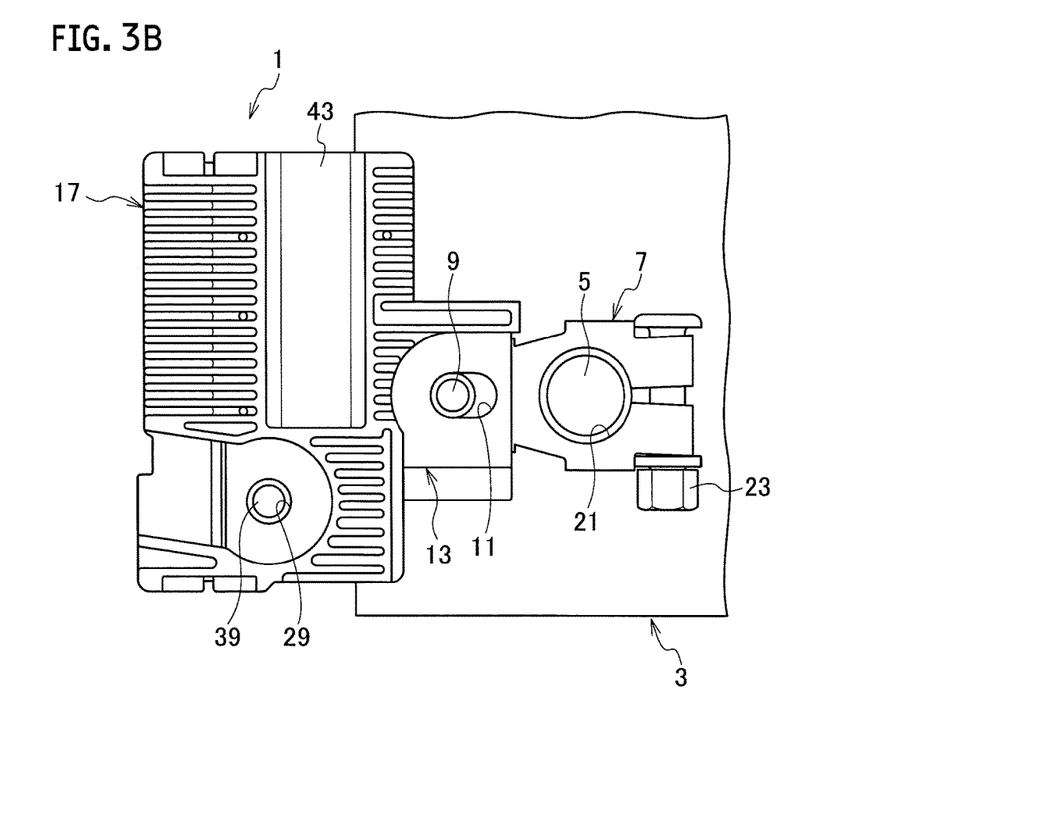
FIG. 3B is an upper surface view when the fuse unit according to the embodiment of the present invention has been assembled to the battery of the one example.
Figure 4A:
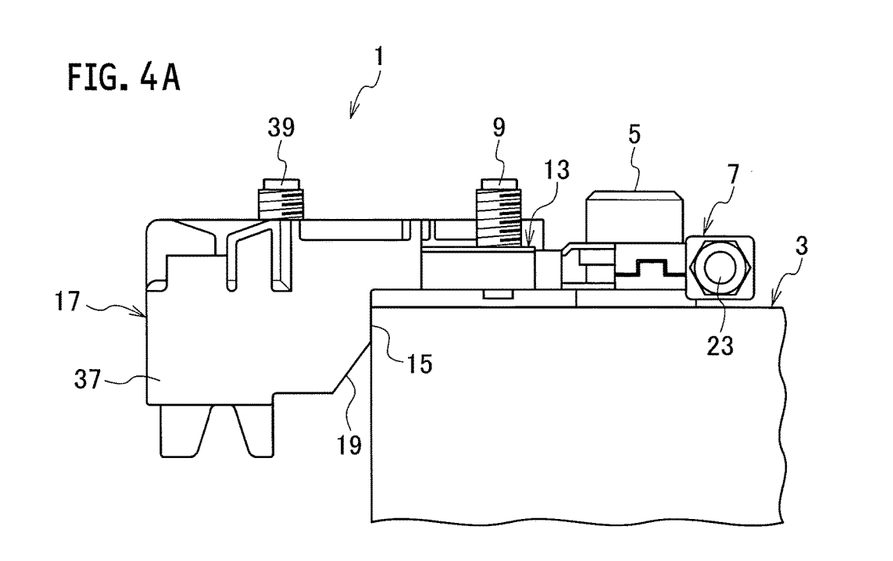
FIG. 4A is a side surface view when the fuse unit according to the embodiment of the present invention has been assembled to a battery of another example.
Figure 4B:
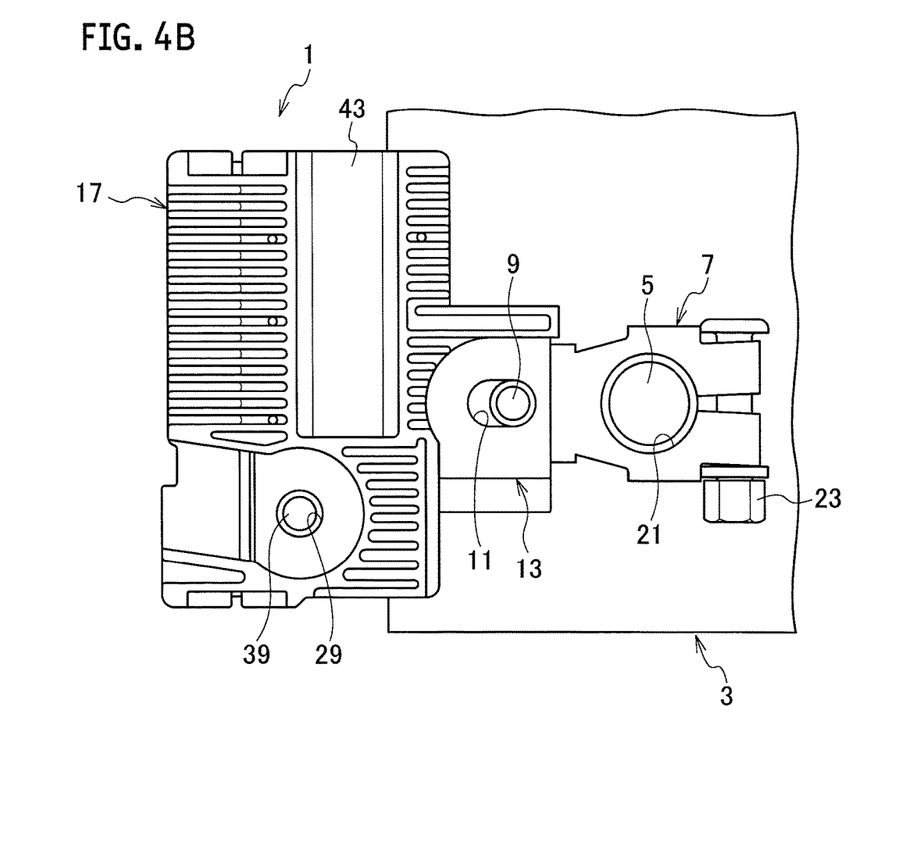
FIG. 4B is an upper surface view when the fuse unit according to the embodiment of the present invention has been assembled to the battery of the other example.
Figure 5:
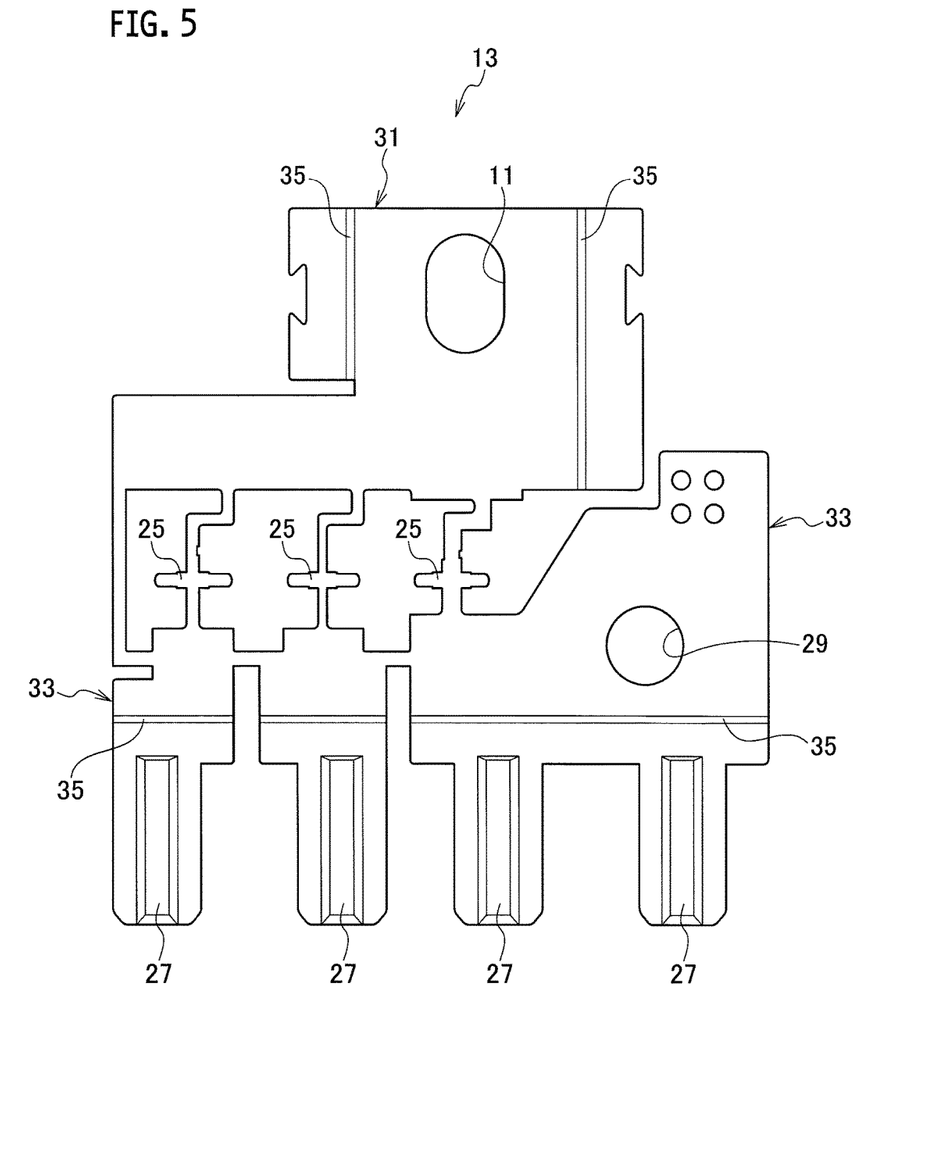
FIG. 5 is an exploded view of the fuse element of the fuse unit according to the embodiment of the present invention.
Figure 6A:
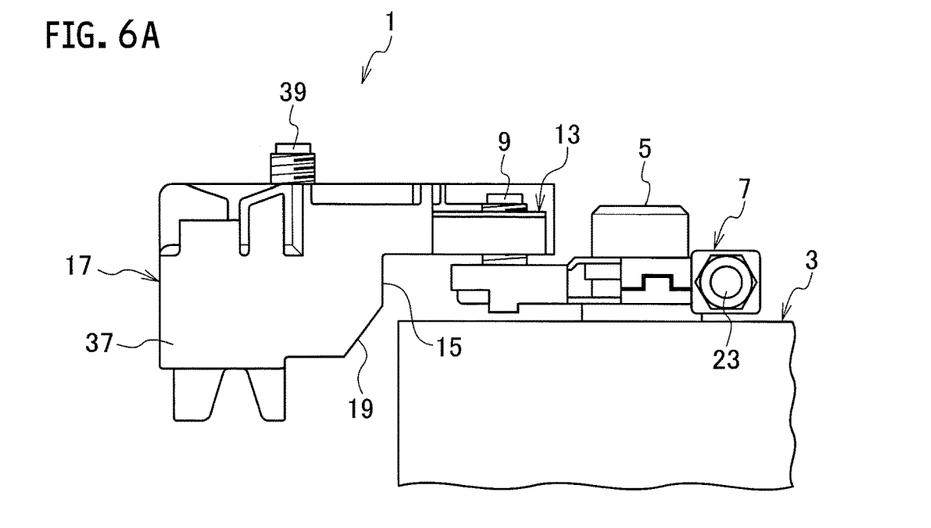
FIG. 6A is a side surface view when the fuse unit according to the embodiment of the present invention is assembled to the battery of the one example.
Figure 6B:
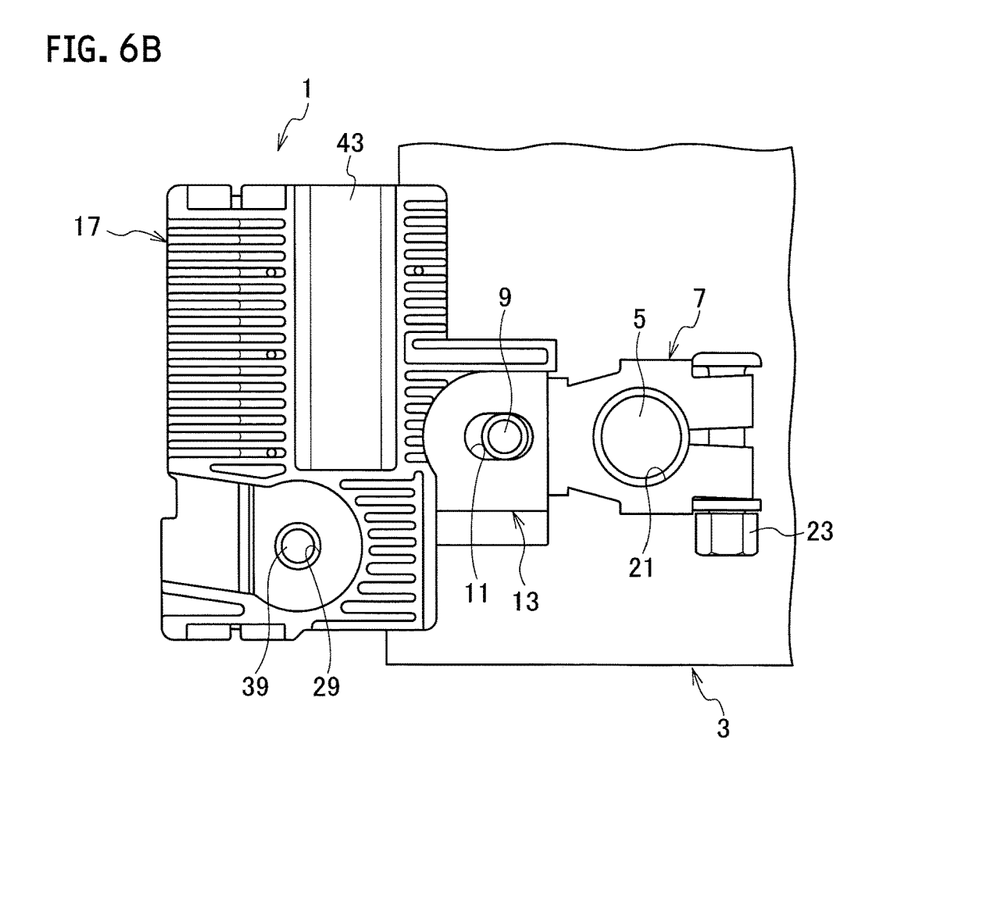
FIG. 6B is an upper surface view when the fuse unit according to the embodiment of the present invention is assembled to the battery of the one example.
Figure 7A:
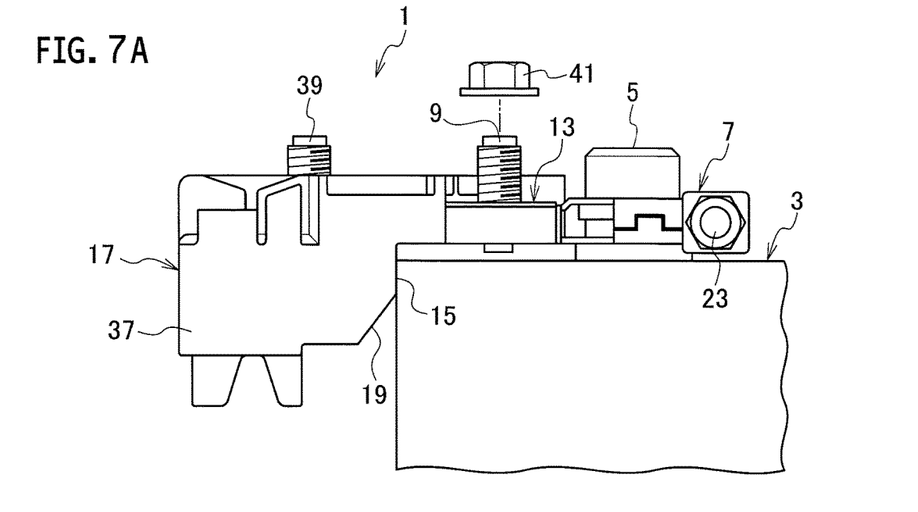
FIG. 7A is a side surface view when the fuse unit according to the embodiment of the present invention has been assembled to the battery of the one example.
Figure 7B:
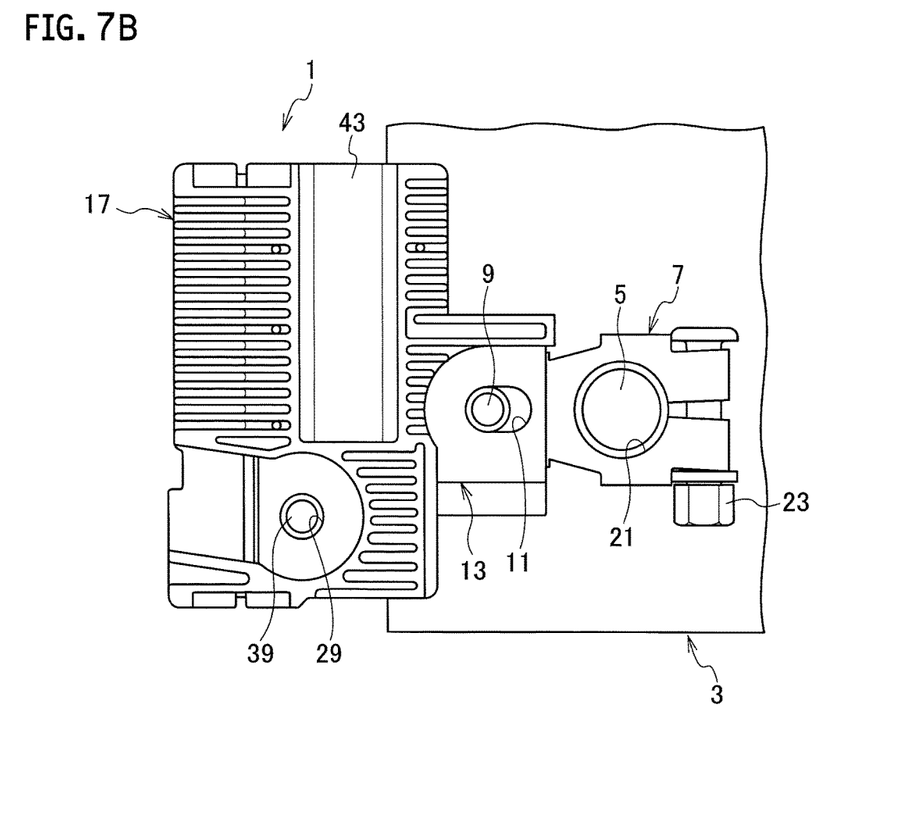
FIG. 7B is an upper surface view when the fuse unit according to the embodiment of the present invention has been assembled to the battery of the one example.

For example, when the fuse unit 1 is assembled to the battery 3 having the shortest distance from the battery post 5 to the side surface of the battery 3, first, the fuse unit 1 is arranged on the upper surface of the battery 3, and the stud bolt 9 of the battery terminal 7 is inserted into the insertion hole 11 of the fuse unit 1, as illustrated in FIGS. 6 and 7.

Next, the stud bolt 9 of the battery terminal 7 is completely inserted into the insertion hole 11 of the fuse unit 1, the fuse unit 1 is moved toward the side surface of the battery 3, and then the abutment portion 15 of the fuse unit 1 is made to abut on the side surface of the battery 3.

In addition, the nut 41 is fastened onto the stud bolt 9 of the battery terminal 7 to fix the insertion hole 11 into the stud bolt 9 and the fuse unit 1 and the battery 3 are electrically connected to each other via the battery terminal 7.

Figure 8A:
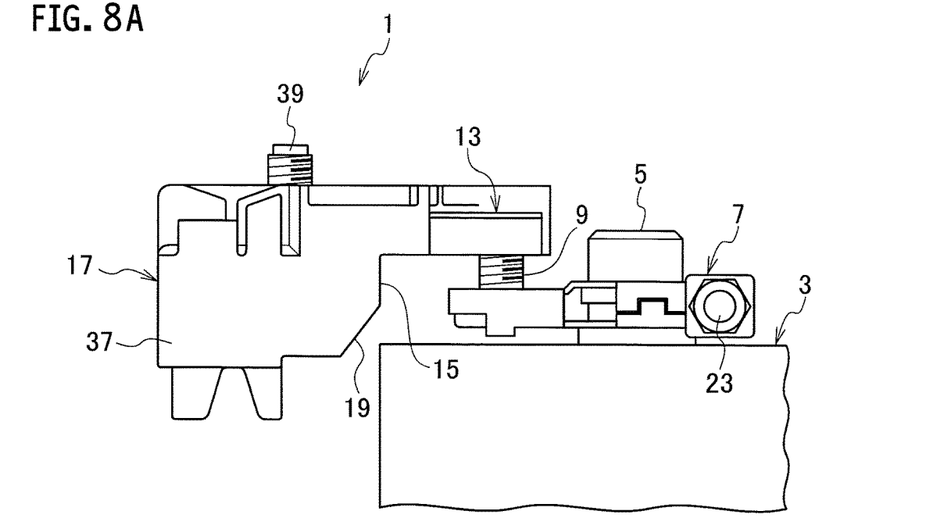
FIG. 8A is a side surface view when the fuse unit according to the embodiment of the present invention is assembled to the battery of the other example.
Figure 8B:
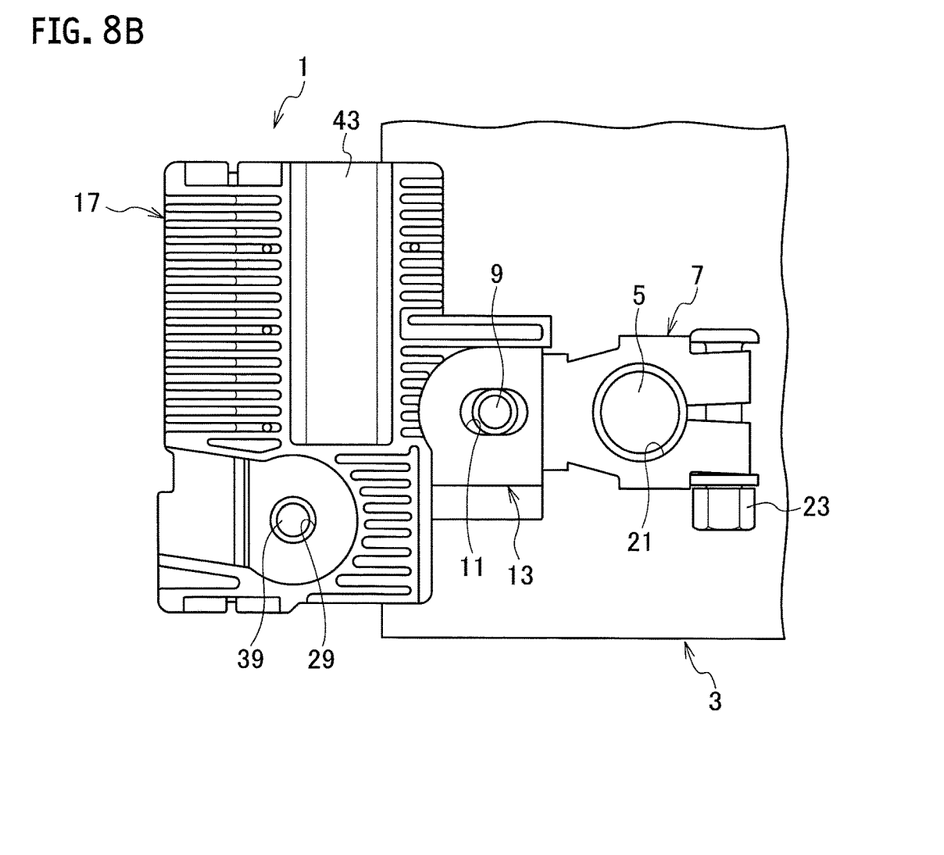
FIG. 8B is an upper surface view when the fuse unit according to the embodiment of the present invention is assembled to the battery of the other example.
Figure 9:
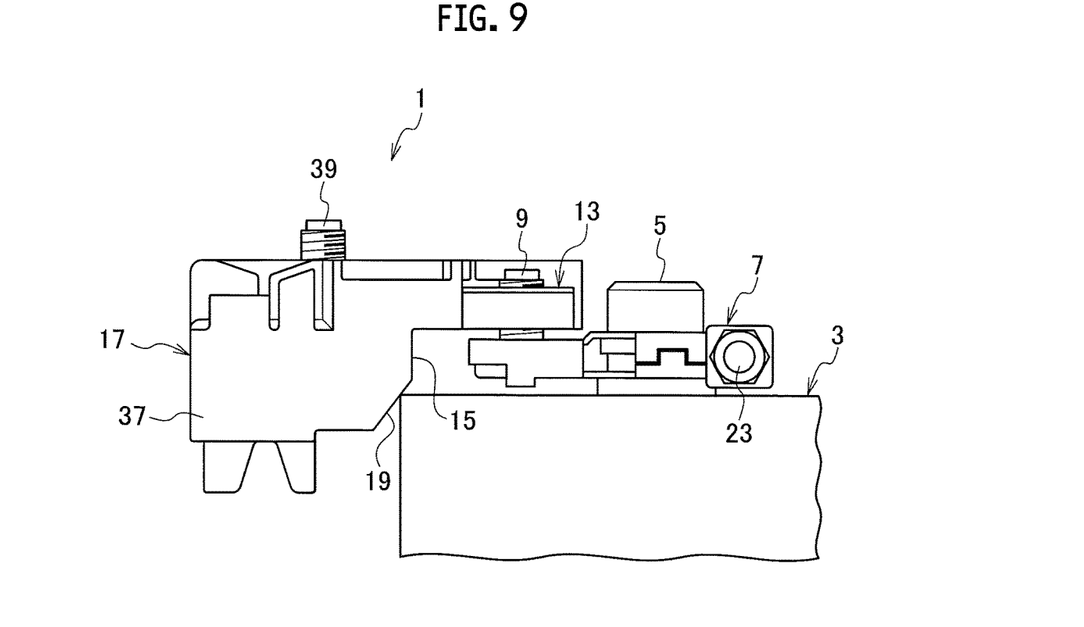
FIG. 9 is a side surface view when the fuse unit according to the embodiment of the present invention is in the middle of being assembled to the battery of the other example.
Figure 10A:
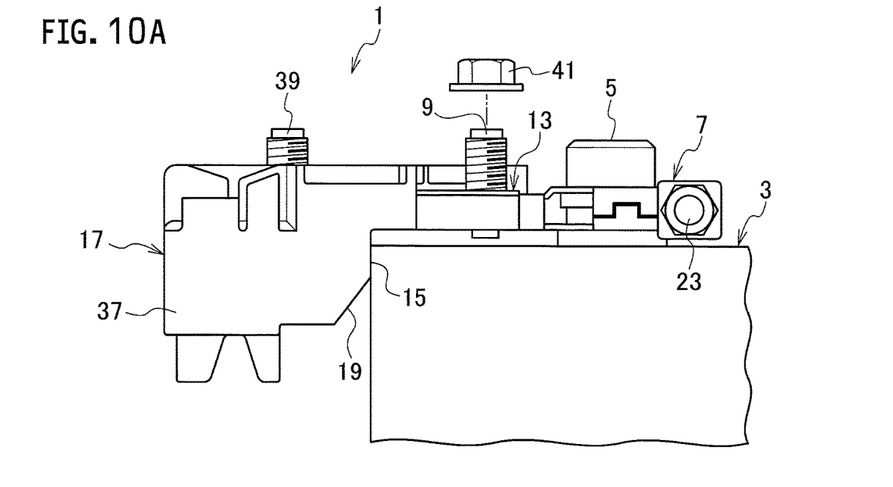
FIG. 10A is a side surface view when the fuse unit according to the embodiment of the present invention has been assembled to the battery of the other example.
Figure 10B:
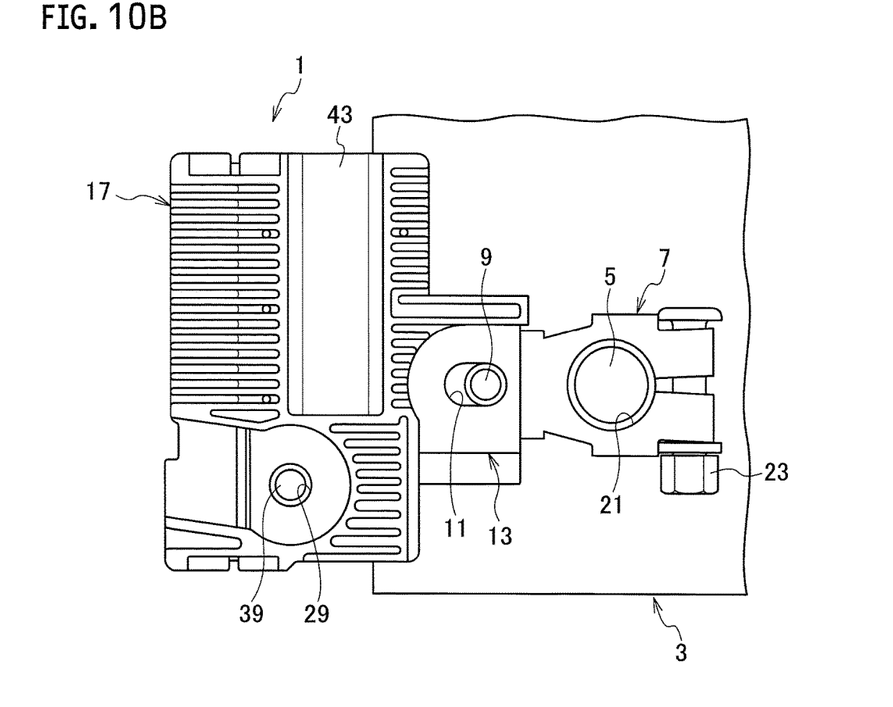
FIG. 10B is an upper surface view when the fuse unit according to the embodiment of the present invention has been assembled to the battery of the other example.

On the other hand, when the fuse unit 1 is assembled to the battery 3 having the longest distance from the battery post 5 to the side surface of the battery 3, first, the fuse unit 1 is arranged on the upper surface of the battery 3, and the stud bolt 9 of the battery terminal 7 is inserted into the insertion hole 11 of the fuse unit 1, as shown in FIGS. 8 to 10.

Subsequently, the stud bolt 9 of the battery terminal 7 is completely inserted into the insertion hole 11 of the fuse unit 1. At this time, the tapered surface 19 formed at the end portion of the abutment portion 15 slides with respect to the upper surface end portion of the battery 3, and the abutment portion 15 is positioned on the side surface of the battery 3 to thereby be in a state of being made to abut.

In addition, the nut 41 is fastened onto the stud bolt 9 of the battery terminal 7 to thereby fix the stud bolt 9 into the insertion hole 11, and the fuse unit 1 and the battery 3 are electrically connected to each other via the battery terminal 7.

In the fuse unit 1, for the plurality of batteries 3 each having the battery post 5 at different arrangement position, the insertion hole 11 of the fuse element 13 is formed in a shape allowing insertion of the stud bolt 9 thereinto in a state where the side surface of the battery 3 and an abutment portion 15 of the resin body 17 abut on each other. Accordingly, the side surface of the battery 3 and the abutment portion 15 of the resin body 17 abut on each other and thus the stud bolt 9 of the battery terminal 7 can be inserted into the insertion hole 11 of the fuse element 13 to thereby be assembled to the various types of the batteries 3 having the different position of the battery post 5.

Therefore, in the fuse unit 1, the differences among the positions of the battery posts 5 can be absorbed due to the shape of the insertion hole 11 of the fuse element 13, with the result that the fuse unit 1 can be assembled to various types of batteries 3.

Additionally, since the insertion hole 11 of the fuse element 13 is formed in the oblong hole shape in the abutting direction between the side surface of the battery 3 and the abutment portion 15 of the resin body 17, the resin body 17 can be moved along the insertion hole 11 with respect to the side surface of the battery 3 in a state where the stud bolt 9 of the battery terminal 7 is inserted into the insertion hole 11 of the fuse element 13, and thus the abutment between the side surface of the battery 3 and the abutment portion 15 of the resin body 17 can be guided.

Furthermore, since the tapered surface 19 that slides with respect to the upper surface end portion of the battery 3 is formed at the end portion of the abutment portion 15 of the resin body 17, when the resin body 17 is assembled to the battery 3, and thus the abutment between the side surface of the battery 3 and the abutment portion 15 of the resin body 17 can be guided by sliding the tapered surface 19 with respect to the upper surface end portion of the battery 3.

Note that, according to the fuse unit of the present embodiment, the insertion hole of the fuse element is formed in the oblong hole shape, but it is not limited to the shape described above. For example, the insertion hole may be formed in a polygonal shape.

In this case, the fuse unit can be assembled to, in addition to a battery of a type having a different distance from the battery post to the side surface of the battery, a battery of a type having a different distance in a direction intersecting with a straight line connecting the battery post and the side surface of the battery on the upper surface of the battery, namely, various types of batteries freely provided with the battery post on the upper surface of the battery.

What is claimed is:

1. A fuse unit comprising:
   a fuse element including an insertion hole into which a stud bolt is inserted, the stud bolt protrudingly provided on a battery terminal fixed to a battery post protrudingly provided on an upper surface of a battery; and
   a resin body integrally formed with the fuse element by insert molding, and including an abutment portion abutting on a side surface of the battery,
   wherein, for a plurality of batteries each having the battery post at a different arrangement position, the insertion hole of the fuse element is formed in a shape allowing insertion of the stud bolt thereinto in a state where the side surface of the battery and the abutment portion of the resin body abut on each other,
   wherein an end portion of the abutment portion of the resin body comprises a tapered surface, and
   wherein the tapered surface is constituted to slide with respect to an upper surface end portion of the battery and to guide the positioning of the abutment portion of the resin body abutting the side surface of the battery so as to maintain a state in which the stud bolt is inserted into the insertion hole, when the resin body is assembled to the battery.

2. The fuse unit according to claim 1, wherein the insertion hole of the fuse element is formed in an oblong hole shape extending in an abutting direction between the side surface of the battery and the abutment portion of the resin body.

3. The fuse unit according to claim 1, wherein the fuse element is made of a conductive material in a thin-plate shape, and further comprises:
   a plurality of fusible body fixing portions,
   a plurality of tab terminals, and
   a device connection hole.

4. The fuse unit according to claim 3, wherein the plurality of fusible body fixing portions couples between a power-source connection portion including the insertion hole and a plurality of device connection portions provided with the plurality of tab terminals and the device connection hole.

5. The fuse unit according to claim 4, wherein the plurality of tab terminals is each provided at the plurality of device connection portions, and arranged parallel to the side surface of the battery by bending a bending portion provided at the plurality of device connection portions.

6. The fuse unit according to claim 4, wherein the plurality of tab terminals is arranged in a connector portion of the resin body by insert molding for forming the resin body and for integrating the fuse element with the resin body.

7. The fuse unit according to claim 4, wherein the fuse element is cut at a predetermined position of coupling portions for coupling a power-source connection portion with the plurality of device connection portions.

8. The fuse unit according to claim 4, wherein the resin body is molded in an L-like shape such that the insertion hole and the device connection hole of the fuse element are positioned on the upper surface of the battery and the connector portion where the plurality of tab terminals of the fuse element is arranged is positioned on the side surface of the battery.

9. A fuse unit comprising:
a fuse element comprising an insertion hole into which a stud bolt is inserted, the stud bolt protrudingly provided on a battery terminal fixed to a battery post protrudingly provided on an upper surface of a battery; and
a resin body integrally formed with the fuse element by insert molding, and including an abutment portion abutting on a side surface of the battery, wherein
for a plurality of batteries each having the battery post at a different arrangement position, the insertion hole of the fuse element is formed in a shape allowing insertion of the stud bolt thereinto in a state where the side surface of the battery and the abutment portion of the resin body abut on each other,
a tapered surface is formed at an end portion of the abutment portion of the resin body, the tapered surface slides with respect to an upper surface end portion of the battery when the resin body is assembled to the battery and guides the positioning of the abutment portion on the side surface of the battery,
the fuse element is made of a conductive material in a thin-plate shape, and comprises:
a plurality of fusible body fixing portions,
a plurality of tab terminals, and
a device connection hole,
wherein the plurality of fusible body fixing portions couples between a power-source connection portion including the insertion hole and a plurality of device connection portions provided with the plurality of tab terminals and the device connection hole.

10. The fuse unit according to claim 9, wherein the plurality of tab terminals is provided at the plurality of device connection portions, and arranged parallel to the side surface of the battery by bending a bending portion provided at the plurality of device connection portions.

11. The fuse unit according to claim 9, wherein the plurality of tab terminals is arranged in a connector portion of the resin body by insert molding for forming the resin body and for integrating the fuse element with the resin body.

12. The fuse unit according to claim 9, wherein the fuse element is cut at a predetermined position of coupling portions for coupling a power-source connection portion with the plurality of device connection portions.

13. The fuse unit according to claim 9, wherein the resin body is molded in an L-like shape such that the insertion hole and the device connection hole of the fuse element are positioned on the upper surface of the battery and the connector portion where the plurality of tab terminals of the fuse element is arranged is positioned on the side surface of the battery.

* * * * *